United States Patent [19]
Shen et al.

[11] Patent Number: 5,687,336
[45] Date of Patent: Nov. 11, 1997

[54] STACK PUSH/POP TRACKING AND PAIRING IN A PIPELINED PROCESSOR

[75] Inventors: Gene Shen, Mountain View; Shalesh Thusoo, Milpitas; James S. Blomgren, San Jose, all of Calif.

[73] Assignee: Exponential Technology, Inc., San Jose, Calif.

[21] Appl. No.: 584,836

[22] Filed: Jan. 11, 1996

[51] Int. Cl.[6] .................................................. G06F 9/32
[52] U.S. Cl. .................................................. 395/378
[58] Field of Search ........................ 395/DIG. 1 MS File, 395/DIG. 2 MS File, 378, 395, 410, 588, 427, 445, 459

[56] References Cited

U.S. PATENT DOCUMENTS

| | | | |
|---|---|---|---|
| 4,524,416 | 6/1985 | Stanley et al. | 395/410 |
| 4,974,158 | 11/1990 | Watanabe et al. | 395/378 |
| 4,984,151 | 1/1991 | Dujari | 395/588 |
| 5,006,980 | 4/1991 | Sanders et al. | 395/395 |
| 5,142,635 | 8/1992 | Saini | 395/375 |
| 5,566,307 | 10/1996 | Watanabe et al. | 395/378 |

*Primary Examiner*—Robert B. Harrell
*Attorney, Agent, or Firm*—Stuart T. Auvinen

[57] ABSTRACT

A pipelined processor executes several stack instructions simultaneously. Additional shadow registers for stack pointers of instructions in the pipeline are not needed. Instead the new stack pointer is generated once at the end of the pipeline and written to the register file. The stack pointer is needed for generating the stack-top address in memory. The stack-top address is generated early in the pipeline. Other stack instructions in the pipeline which have not yet incremented the stack pointer are located with a stack valid bit array. The stack valid array indicates the increment or decrement amounts for stack instructions in each pipeline stage. An overall displacement or increment value is computed as the sum of all increments and decrements for stack instructions in the pipeline which have not yet updated the stack pointer. The overall displacement which accounts for all unfinished stack instructions is added to the stack pointer from the register file to generate the stack-top address. Thus the new stack pointer does not have to be generated before the stack memory is accessed. Pushes or pops are paired by doubling the increment amount in the stack valid bit array and performing a double-width data transfer.

19 Claims, 6 Drawing Sheets

|  | | PL-1 | PL-2 | PL-3 | |
|---|---|---|---|---|---|
| PUSH 60 | D | -4 | 0 | 0 | -4 |
| NOP 72 | A | 0 | 0 | 0 | |
| PUSH 74<br>PUSH 76 | C | -4 | -4 | 0 | -8 |
| POP 78 | M | +4 | 0 | 0 | +4 |
| NOP 80 | W | 0 | 0 | 0 | |

STACK PUSH/POP TRACKING AND PAIRING IN A PIPELINED PROCESSOR

BACKGROUND OF THE INVENTION—FIELD OF THE INVENTION

This invention relates to stack operations on a digital computer, and more particularly for pipelining push and pop stack operations.

BACKGROUND OF THE INVENTION—DESCRIPTION OF THE RELATED ART

The rapid execution of instructions has been an area of intense developmental efforts by the microprocessor industry. One approach has been to reduce the complexity of the instructions, thus reducing the computational work required by each instruction. However, many programs have been written for older complex instruction sets, and it is thus very desirable to execute these older, complex instruction sets.

Stack-based addressing is common in these older complex instruction sets. A stack is a data structure that is accessed in a first-in, last-out fashion. Data that is stored to the stack is "pushed" onto the top of the stack, while data read off the stack is "popped" off the top of the stack. Thus the top of the stack (TOS) is the memory location that is normally read or written. A pointer called a stack pointer (SP) contains the location of the top of the stack. When data is written (pushed) to the stack, this stack pointer is first incremented to point to the next unoccupied memory location, and the data is then written to this unoccupied location. When the data is read from the stack, the top of the stack is accessed by reading the location pointed to by the stack pointer, and then the stack pointer is decremented to point to the previous data item on the stack.

The x86 architecture includes complex, stack-based instructions. The x86 architecture was originally used by the 8086, 286, 386, and 486 processors manufactured by Intel Corporation of Santa Clara, Calif., and is now used by many other processors by such companies as Advanced Micro Devices of Sunnyvale, Calif., and Cyrix of Richardson, Tex.

The x86 architecture includes several variants of stack instructions. These stack instructions fundamentally increment the stack pointer and store data to the stack (a PUSH) or read data from the top of the stack and decrement the stack pointer (a POP). However, the x86 uses a upside-down stack that grows downward rather than upward. Thus PUSHes actually decrement the stack pointer while POPs increment the stack pointer. For purposes of explanation, the stack is described herein as a right-side-up stack while in practice an inverted stack is used.

Another x86 complexity is that the stack resides in a stack segment. The stack pointer may be an offset address within that stack segment rather than an absolute address. The offset is measured in units of bytes, with each data item stored in the stack typically being 32-bits (four bytes) in size, although other sizes may occasionally be used. Thus the stack pointer is incremented by 4 bytes for a PUSH, but decremented by 4 bytes for a POP.

Pipelining Stack Instructions Problematic

A particular problem with stack operations is pipelining them. In a pipelined processor, the work of executing an instruction is broken down into smaller steps. Each step is executed in a hardware unit called a pipestage or a stage. When a stack operation is executed, it is decoded and the stack pointer read in a first pipeline stage. In a second stage the address in memory of the stack top is calculated from the stack pointer. Then the memory is accessed in the following stage. Finally the stack pointer is updated in the final stage of a pipeline.

The problem arises when several stack instructions are in the pipeline at the same time. An older stack instruction needs to update the stack pointer before younger stack instructions read the stack pointer.

The stack pointer must be read early in the pipeline to calculate the address in the memory of the stack top. However, the stack pointer may not be updated by the older instruction until the end of the pipeline. Thus the younger stack instructions may have to stall until the stack pointer is updated, especially when back-to-back stack instructions are encountered. This reduces performance.

A Prior-Art Solution Uses Multiple Additional SP Registers and Busses

Saini, in U.S. Pat. No. 5,142,635, assigned to Intel Corporation, discloses one method to execute multiple stack operations in a pipelined processor. Saini uses multiple stack-pointer registers, latches, and busses which are updated at various times within the pipeline. (See ESP 122, ASP 124, SSP 120 and I-bus, M-bus, and J-bus of his FIG. 4.) Since the stack pointer is a 32-bit value, these extra registers and busses are 32-bits in width and add to the expense and complexity of the processor.

What is desired is a pipelined processor for executing stack instructions. It is desired to have multiple stack instructions being simultaneously executed in various stages of the pipeline without adding many extra stack registers and busses for the stack pointer.

SUMMARY OF THE INVENTION

A pipeline for processing multiple stack instructions includes a plurality of pipeline stages for processing instructions. A register file stores operands for input to the pipeline and results from the pipeline while a stack pointer register stores a stack pointer indicating a top of a stack. An array of stack-instruction valid bits indicate which pipeline stages in the plurality of pipeline stages contain a stack instruction.

A stack-top address generating means receives stack-instruction valid bits from the array of stack-instruction valid bits. It generates a memory address of the top of the stack in memory. A memory access means responds to the memory address from the stack-top address generating means and transfers data between the stack in memory and the register file. A stack pointer update means receives the stack pointer and adds a final adjust to the stack pointer and writes a sum to the stack pointer register when a stack instruction completes processing by the pipeline.

The stack-instruction valid bits thus indicate which pipeline stages in the plurality of pipeline stages contain a stack instruction, and the stack-instruction valid bits are used to generate the memory address of the stack in memory.

In further aspects of the invention the absolute value of the final adjust for a particular stack instruction is equal to the size of the data transferred by the memory access means for the particular stack instruction. The sign of the final adjust indicates if the particular stack instruction is a push stack instruction or a pop stack instruction. The push stack instruction reads data from the register file and writes the data to the stack in memory, but the pop stack instruction reads the data from the stack in memory and writes the data to the register file.

In still further aspects of the invention the array of stack-instruction valid bits is a plurality of single-stage stack valid bits. Each of the plurality of single-stage stack valid bits includes a displacement indicator means for indicating the amount and direction of the adjust for stack instructions being processed in that stage. The pipeline includes means for copying the single-stage stack valid bits in the stage to the single-stage stack valid bits for a next stage when the stack instruction advances to the next stage in the pipeline.

In other aspects of the invention the stack-top address generating means has an overall displacement generating means which receives the stack-instruction valid bits. It generates an overall displacement between a memory address pointed to by the stack pointer in the stack pointer register and the top of the stack in memory to be accessed by a stack instruction at the beginning of the pipeline. The overall displacement is a sum of adjusts for other stack instructions in the pipeline which have not yet completed processing by the pipeline.

An address adder means receives the overall displacement and the stack pointer from the stack pointer register, and it generates as a sum the memory address of the top of the stack in memory. The address adder means further adds in a segment base address to the overall displacement and the stack pointer when generating the memory address of the top of the stack. The segment base address is a base address for a stack segment in memory containing the stack.

Pushes or pops are paired by doubling the increment amount in the stack valid bit array and performing a double-width data transfer.

DETAILED DESCRIPTION

The present invention relates to an improvement in stack-instruction pipelining. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
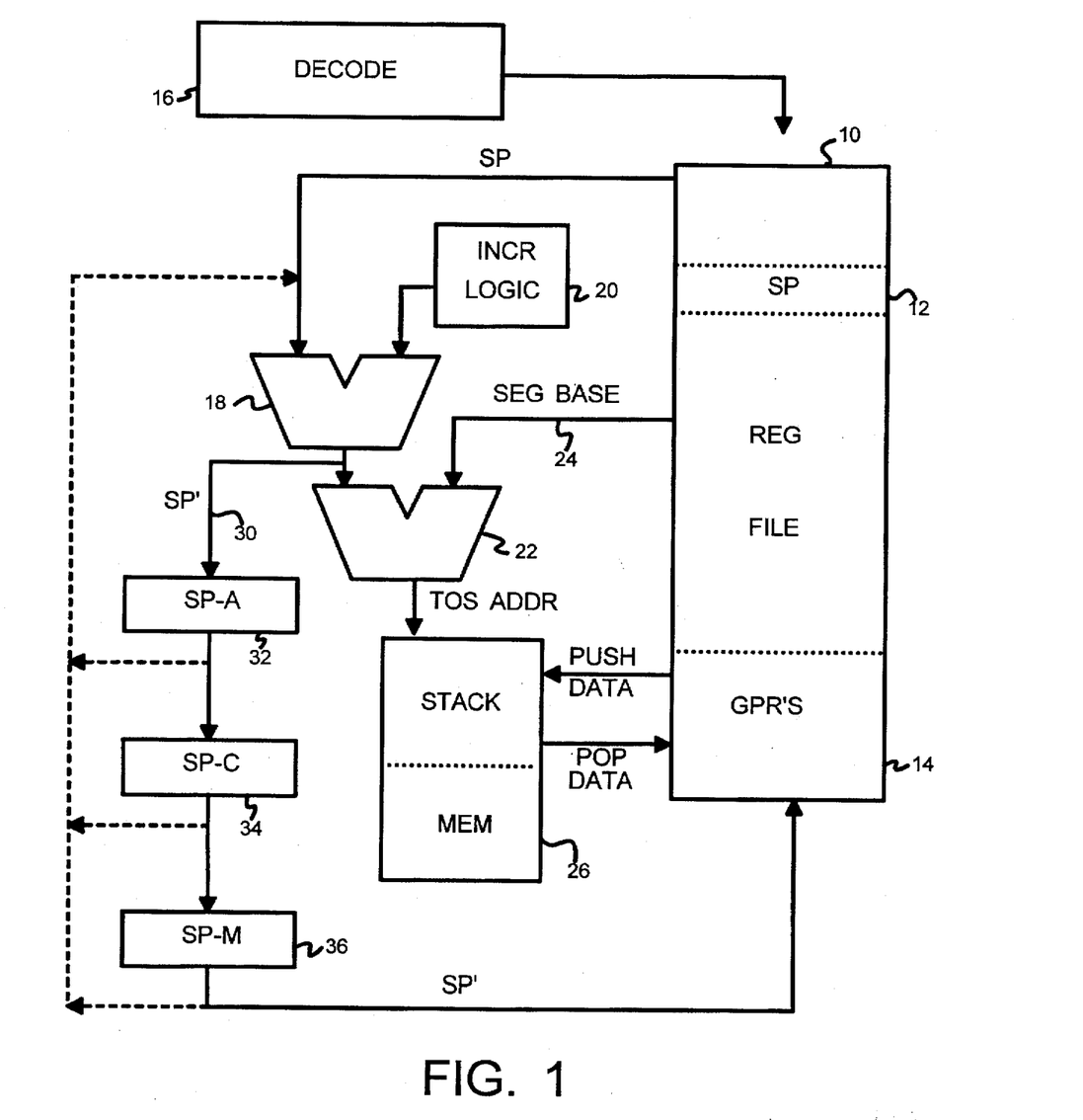
FIG. 1 is a pipelined processor for pipelining stack instructions by staging multiple stack pointers down the pipeline.

FIG. 1 is a pipelined processor for pipelining stack instructions by staging multiple stack pointers down the pipeline. One more obvious way of executing multiple stack instructions in a pipeline is to generate the stack pointer early in the pipeline, before the memory access. This calculated stack pointer is then staged down the pipeline and finally written to the register file in the last pipeline stage.

The pipeline of the preferred embodiment is a five-stage pipeline. The stages are D, A, C, M, and W, for decode, address generate, cache, memory/execute, and write-back. The instruction is decoded in the D stage. An address of an operand in memory is calculated in the A stage. This address is used to access the operand in the cache during the C and M stage, and pipeline stalls are added if the cache misses and main memory must be accessed. During the M stage any ALU or execute type of operations are performed. The final result is written back to the register file in the W stage. Many other variations of pipeline stages can employ the invention described herein as the exact number and type of stages can be varied by persons of skill in the art.

An instruction is first decoded in the D stage instruction decoder 16. Fields in the instruction can indicate which registers in register file 10 are accessed by the instruction. For stack-type instructions, stack pointer 12 (SP) is read from register file 10 and inputted to first adder 18. Increment logic 19 determines how many bytes the stack pointer (SP) should be incremented, and this increment value from increment logic 19 is added to stack pointer 12 in first adder 18 to produce the new stack pointer SP' 30. This new stack pointer SP' is stored in register 32 and then staged down the pipeline through registers 34, 36, during the A, C, and M stages. In the final W stage the new stack pointer SP' is written to stack pointer 12 in register file 10.

Since the stack pointer SP may be updated by an older instruction in the pipeline, the stack pointer 12 in register file 10 may not be the correct stack pointer. Instead, the stack pointer updated by an older instruction in the A, C, or M stages may be used by inputting the updated stack pointers from registers 32, 34, 36 to first adder 18 rather than stack pointer 12 from register file 10.

Second adder 22 then adds the segment base address from register file 10 to the new stack pointer 30 to generate the linear address of the top of the stack in memory 26. Data is then pushed or popped from the stack in memory 26 to general-purpose registers (GPR's) 14 in register file 10.

Figure 2:
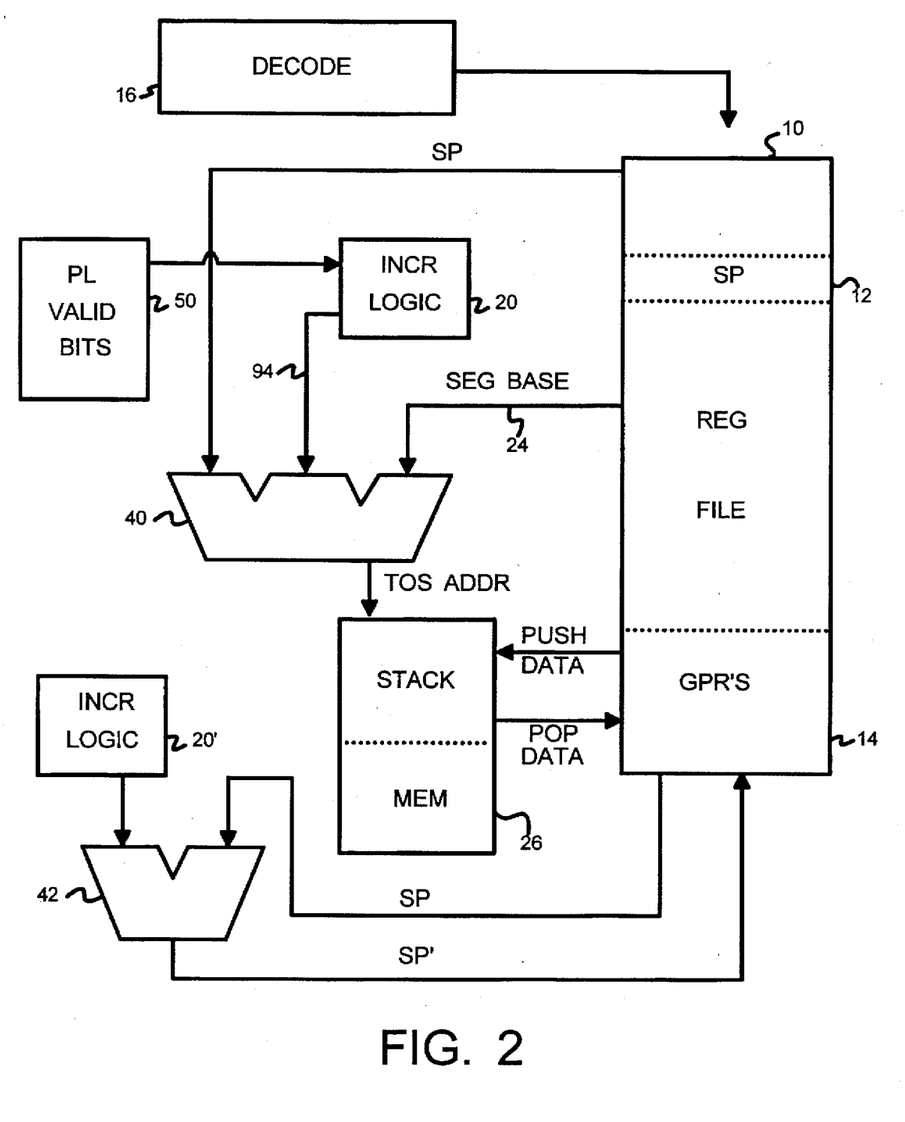
FIG. 2 is an improvement in a pipelined processor for executing multiple stack instructions in the pipeline.

FIG. 2 is an improvement in a pipelined processor for executing multiple stack instructions in the pipeline. Decode 16, register file 10, and memory 26 operate as described for FIG. 1. Pipeline valid bits 50 indicate the locations of valid stack instructions in the pipeline. From the locations of the stack instructions from valid bits 50, increment logic 20 determines increment value 94 to add to stack pointer 12 stored in register file 10. If older stack instructions exist in the pipeline, an additional amount of increment value 94 is added by logic 20 to account for the older stack instructions in the pipeline.

Three-port adder 40 is used to generate the address of the top of the stack (TOS) directly without calculating the new stack pointer. The old stack pointer 12 from register file 10, along with the increment amount from increment logic 20 and the segment base address 24 are added together without having to generate the new stack pointer.

The new stack pointer SP' is not generated until the end of the pipeline, when the new stack pointer is written to the register file 10. Final increment logic 20' generates increment value 94 for the instruction at the end of the pipeline, which is added to stack pointer 12 in final adder 42 to generate the new stack pointer SP'. Thus the updated stack pointer need only be generated at the end of the pipeline.

Timing of Multiple Stack Instructions in Pipeline

Figure 3:
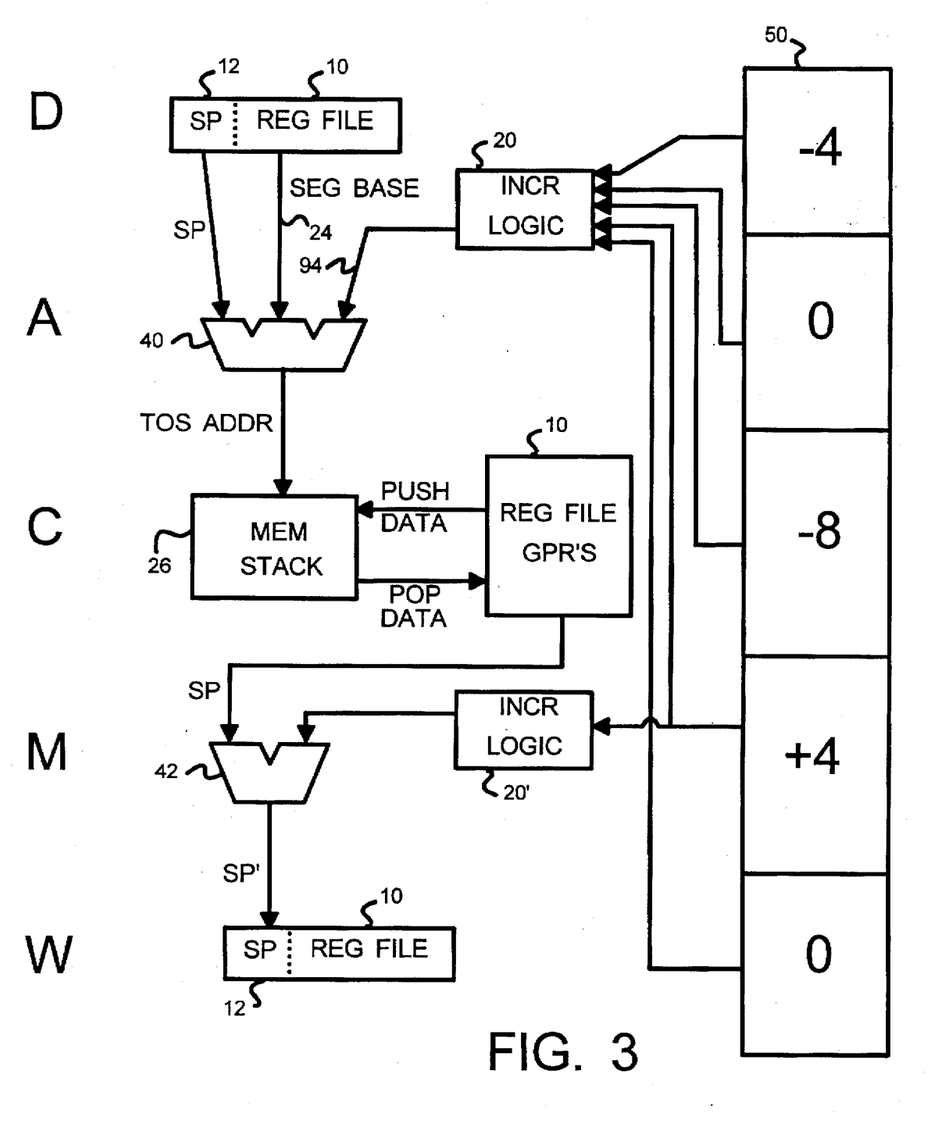
FIG. 3 is a resource timing diagram showing how pipeline resources are arranged in the pipeline sequence for processing multiple stack instructions.

FIG. 3 is a resource timing diagram showing how pipeline resources are arranged in the pipeline sequence for processing multiple stack instructions. In the D stage stack pointer 12 of register file 10 is read. In the following A stage, stack pointer 12 is added to the segment base 24 and to increment value 94.

The increment value 94 is determined by increment logic 20 by reading stack valid bits in pipeline valid bits 50. Stack valid bits are read by increment logic 20 for the D, A, C, M, and W stages. The stack valid bits indicate the locations of valid stack instructions. As shown in FIG. 3, push instructions, which increment the stack pointer by −4, are located in the D and C stages. In the C stage two push instructions are present, so the stack pointer must be incremented by a double amount, −8. A pop instruction is present in stage M, which decrements the stack pointer by +4. The net result:

$$-4+-8++4=-8$$

is increment value 94 outputted from increment logic 20. It is the overall displacement to add to the stack pointer. This addition may be implemented in increment logic 20 as a small 3-bit 5-port adder, or preferably as combinatorial logic.

Three-port adder 40 then performs the addition of the stack pointer, segment base 24, and increment value 94 during the A stage and outputs the sum, which is the address of the top of the stack in memory, to the cache. The cache memory 42 is accessed in the C and M stages. Register file 10 is again accessed in the C M stage to read the pushed data. Popped data is written to register file 10 in the W stage.

Register file 10 is again read in the C stage to provide stack pointer 12 to final adder 42. During the M stage, final adder 42 increments stack pointer 12 by the final increment amount determined by final increment logic 20'. The new stack pointer SP' is written to stack pointer 12 in register file 10 during the W stage.

Final increment logic 20' in stage M is much less complex than increment logic 20 in the earlier stage D. While increment logic 20 adds increment values for all stages, final increment logic 20' only reads the increment value for a single stage, the M stage. Multiple stages of stack valid bits 50 are not read since the stack pointer is being updated at the end of the pipeline. Each cycle that has a valid stack instruction performs the stack pointer increment in final adder 42 in stage M just before writing the new stack pointer value back to register file 10 in the W stage.

Thus stack pointer 12 in register file 10 always contains the value for the correct stack pointer 12. This correct stack pointer value is the stack pointer that would be read by the last instruction in the pipeline, in the W stage. This correct stack pointer is the stack pointer visible to the user, the architectural value.

Multiple Registers for Temporary Stack Pointers Not Needed

No intermediate values for the stack pointer need to be stored. Thus the staging registers 32, 34, 36 of FIG. 1 are deleted. Removing these 32-bit registers is desirable since they are wide, expensive registers. Bussing to and from these registers 32, 34, 36 is also reduced or removed altogether.

When a push instruction is decoded in the D stage, then increment logic 20 includes the increment by −4 for that push instruction in the D stage. However, when a pop instruction is decoded in the D stage, the increment of +4 for that pop is not included in the increment value 94 generated by increment logic 20. The reason that the increment is included for pushes but not for pops being decoded is that the x86 architecture requires that the stack pointer be incremented before a push, but decremented after a pop. A push instruction writes to the next vacant memory location above the top of the stack, so the stack pointer must be incremented before the memory write. However, the pop reads from the occupied memory location at the top of the stack, so the stack pointer is first used for the memory access and then decremented. Thus the stack pointer always points to an occupied memory location at the top of the stack.

Other architectures may invert the x86 scheme and have their stack pointers point to the vacant location above the stack. In that case the stack pointer is decremented before a pop, but incremented after a push.

While in the prior art the stack pointer was generated before the push memory access, since the stack pointer is not discretely generated in the invention before the memory access, the stack pointer increment is actually done by final adder 42 at the end of the pipeline in the M stage. Thus even for push instructions the stack pointer is not physically incremented before the memory access as in the prior art. Instead the three-port adder 40 generates the linear address of the memory location to read or write from without first generating the new stack pointer. The pre-increment of the stack pointer before the memory write is accounted for by including the D-stage's push instruction's increment amount when generating the overall displacement or increment value 94 by increment logic 20. For a D-stage pop instruction, its decrement amount is not included when generating the overall displacement or increment value 94 by increment logic 20.

Three-port adder 40 is the normal address-generate adder in the A stage. Three-port adder 40 adds a base and an index value to segment base 24 for a typical load or store instruction. During stack instructions, segment base 24 is the base address of the stack's segment SS, while for typical data reads and writes to random memory segment base 24 is the data segment DS or the extra segment ES. For some types of branch instructions segment base 24 is the code segment CS.

Final adder 42 is preferably the arithmetic-logic-unit adder which is used to execute calculation-type instructions such as ADD, SUB, etc. Thus adders already present in the pipeline may be used to implement in the invention.

Embodiments of Stack Valid Bits

Several embodiments of stack valid bits 50 are contemplated. Some or all of the stack valid bits may be implemented as detection or decode logic which may decode certain fields in a microcode or control word which controls the hardware to perform the indicated operation defined by the decoded instruction.

A simple array of displacement values for each pipeline stage is shown in FIG. 3. If only one stack instruction can exist in a stage, then the possible increment values for that stage are −4 for a push, +4 for a pop, or 0 for no stack operation. Thus two binary bits can implement the stack valid bits. When pushes or pops can be paired in a single stage so that two pushes or pops are simultaneously executed, then the possible increment values are −8 for two pushes, +8 for two pops, or −4 for one push, +4 for one pop, or 0 for no pushes or pops. Note that a push and a pop cannot be paired together. Four binary bits can implement the stack valid bits when pairing is allowed.

Figure 4:
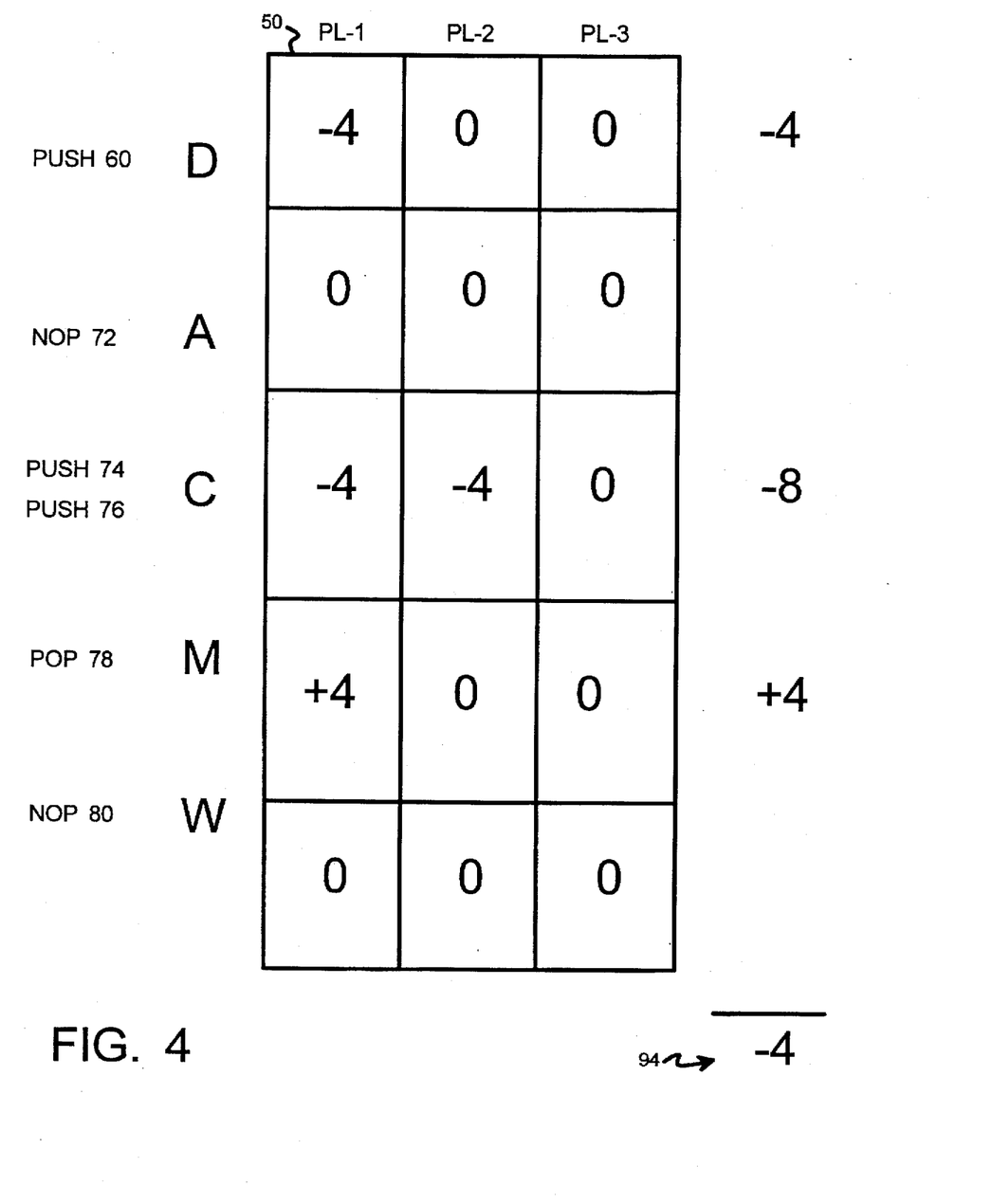
FIG. 4 is a detailed diagram of stack valid bits for a super-scalar processor with three pipelines.

FIG. 4 is a detailed diagram of stack valid bits 50 for a super-scalar processor with three pipelines. In a superscalar processor, multiple pipelines operate in parallel to process and retire more than one instruction per clock cycle. The stack valid bits are extended to include stack valid bits for each pipeline capable of executing stack instructions. As shown in FIG. 4, three pipelines, PL-1, PL-2, and PL-3 each are capable of executing stack instructions. In the D stage a push instruction 60 is in pipeline PL-1, and its stack valid bits are set to −4. The D-stage stack valid bits for pipelines PL-2 and PL-3 are set to 0, indicating that no stack instructions are processed by pipelines PL-1 and PL-2 in the D stage.

For the A stage a non-stack instruction is executed, designated as a no-operation (nop 72) for purposes of illustration, although this instruction 72 could by any of a number of non-stack instructions. The stack valid bits for all three pipelines are set to zero.

Stage C contains a pair of push instructions. Push 74 is allocated to pipeline PL-1, whose stack valid bits are set to –4, while push 76 is allocated to pipeline PL-2, whose stack valid bits are also set to –4.

Stage M has a single pop instruction 78, which sets the stack valid bits in pipeline PL-1 to +4. Stage W has no stack instructions, indicated by nop instruction 80.

At each clock edge the instructions are staged down to the next pipeline stage, and the stack valid bits are also staged down. Thus on the next clock edge, stage D's stack valid bits set to –4 are staged down to the A stage, which is then changed from 0 to –4.

Increment value 94 from increment logic 20 is generated as the sum of each stage's increment or decrement value. Thus increment value 94 is –4, which is the sum of –4, –8, and +4. This sum is represented by high and low electrical signals as is well known in the art. For example, a bus of four or five metal interconnect lines or nets could be used to represent or encode in binary two's complement encoding the possible values for increment value 94.

In other embodiments only one or a few or the pipelines are able to execute stack instructions. Perhaps two pipelines are needed to execute just one stack instruction. For example, a superscalar processor has three pipelines: ALU, MEM, and BR. These pipelines are specialized pipelines which can only execute ALU, load/store, and branch instructions respectively. Stack instructions require both the ALU and the MEM pipelines. Three-port adder 40 and cache memory 26 are located in the MEM pipeline, while final adder 42 is located in the ALU pipeline. Thus both the MEM and ALU pipelines are allocated for each stack instruction.

Multi-Port Register File

Figure 5:
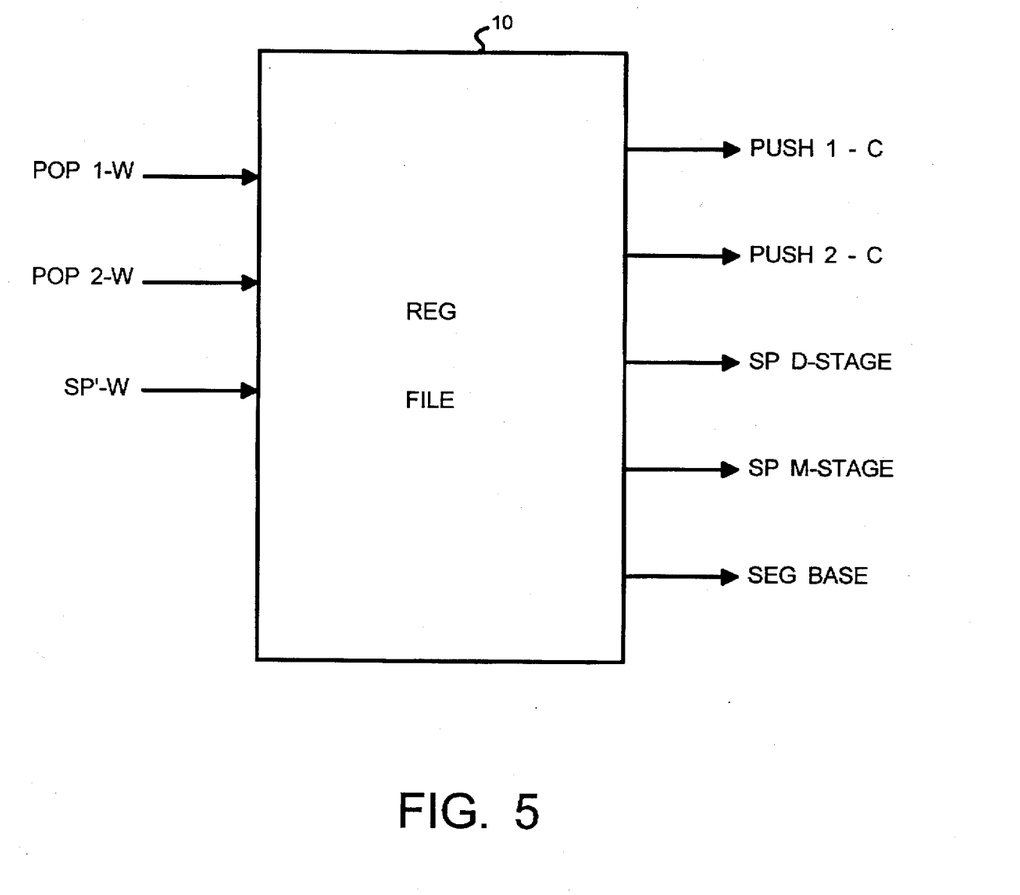
FIG. 5 illustrates a multi-port register file used with the invention.

FIG. 5 illustrates a multi-port register file used with the invention. Register file 10 has three write ports and five read ports. During each processor clock cycle, all ports may be used. Thus five data operands or pointers may be read during each clock cycle, and four results may be written.

Register file 10 includes read ports for reading the stack pointer in the D and C stages, for input to three-port adder 40 in the A stage and to final adder 42 in the M stage. Note that register file 10 is read one stage before the data is needed. The segment base 24 is also read in the D stage for input to three-stage adder 40 in the A stage.

The result or new stack pointer SP' is written in the W stage using one of the write ports. The other two write ports are used for data popped from memory 26 to register file 10. For paired pops, two 32-bit write ports are needed since two 32-bit data words are popped off the stack.

Two read ports are available for paired pushes. When only a single push is present in a stage, then only one of these read ports is used. Paired pushes push up to two 32-bit data words onto the stack in memory 26 and therefore two 32-bit registers in register file 10 are read during a paired push.

Register file 10 is read for pushes during the C stage, or possibly the A stage if memory 26 write timing is critical. For pops, register file 10 is written during the W stage.

Increment Logic

Figure 6:
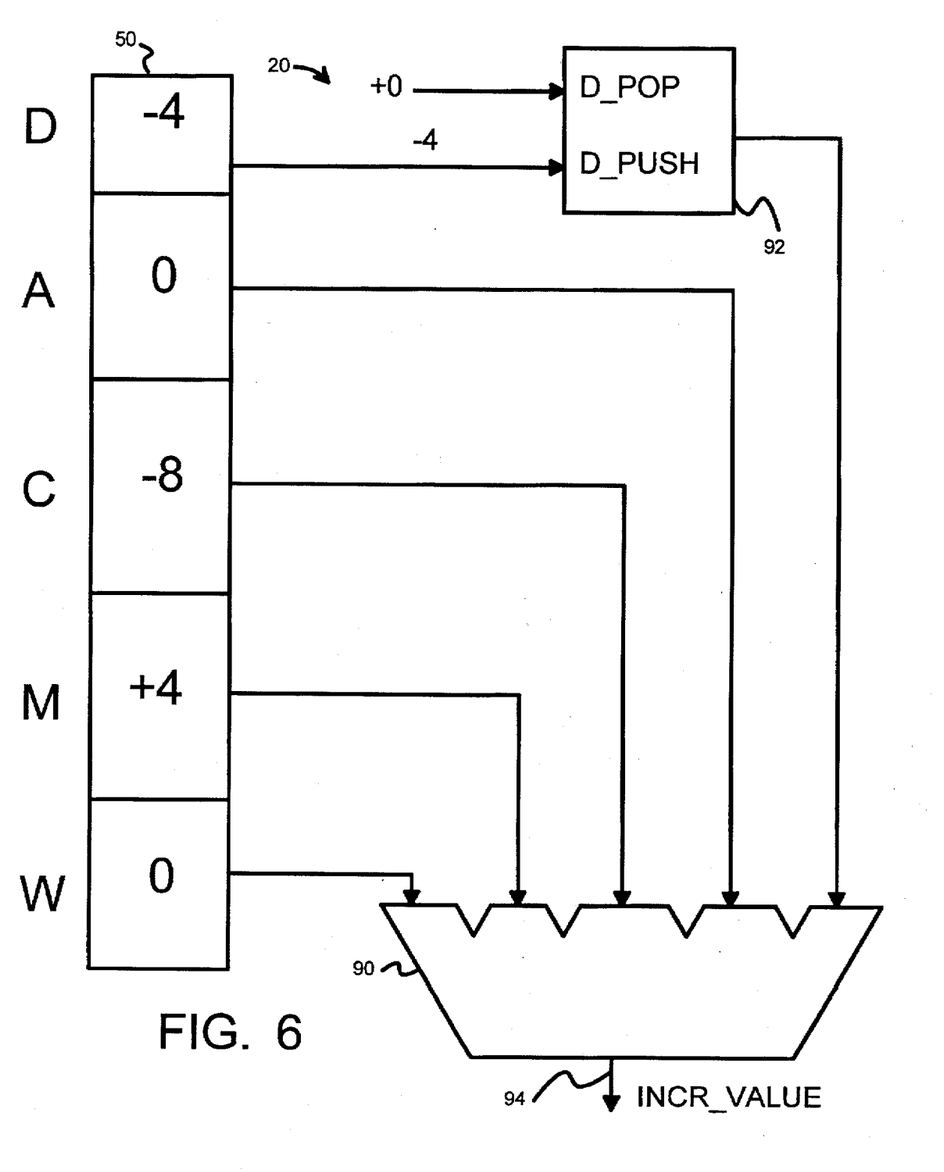
FIG. 6 is an embodiment of the increment logic for generating an overall displacement.

FIG. 6 is an embodiment of increment logic 20. Stack valid bits 50 are read for each pipeline stage, and each stage's increment value is input to adder 90. For the first D stage, mux 92 selects the stack valid bit value of –4 when a push instruction is in the decode stage, but selects +0 when a pop instruction is decoded in the D stage. Thus for pop instructions the top-of-stack memory address does not include the D-stage's decrement when generating the memory address since the x86 architecture decrements the stack pointer after the memory access. However, for push instructions the D-stage increment of –4 is included when generating the memory address.

Instead of physically storing stack valid bits for the first D stage, the decode logic itself can simply input either +0 or +4 to adder 90 and then stage either –4 or +4 down to the A stage's stack valid bits when a pop or push instruction is decoded.

Adder 90 generates the sum of the five stage's increment values and outputs the sum as increment value 94 which is the overall displacement of the new stack pointer for the D-stage when compared to the user-visible stack pointer in the register file.

Push and Pop Pairing

Two pushes or two pops may be simultaneously executed by the same pipeline when paired together. When a pair of pushes or pops are executed, up to 64-bits of data must be transferred between register file 10 and memory 26. Thus two read and two write ports to register file 10 are used. The data path to cache memory 26 is 64-bits in width, so two adjacent, 32-bit data words may be simultaneously read or written. Since the stack is contiguous, when a paired push or pop occurs, the data accessed is adjacent. It is possible that the two data words are not aligned and then additional cache memory 26 cycles may be needed, or the pushes and pops are not paired.

When the stack pointer has been incremented or decremented for a 16-bit operand, the increment/decrement value is ±2 rather than ±4. The next stack access may be mis-aligned when the new stack pointer is not a multiple of four. A simple scheme to detect mis-aligned accesses is to signal a mis-aligned access when the bottom, least-significant three bits of the new stack pointer are not all zeros. Pairing the pushes and pops is then disabled since mis-aligned pushes and pops may cross over to another cache line, requiring a second cache access cycle which reduces performance. Depending upon the size of the cache line, the mis-alignment detection can be altered to prevent push/pop pairing when the two pushes or pops are not both in the same cache line.

Push and pop pairing allows for super-scalar execution without requiring an extra pipeline. Two stack instructions can be executed in a single stage in a single pipeline. The operation performed by the pipeline for a paired push or pop is identical to the operation performed for a single push or pop, except that the increment amount is doubled, and a 64-bit data transfer is performed instead of a 32-bit transfer. Stack valid bits implement a doubled increment easily by storing a larger increment amount. Thus push/pop pairing is more easily implemented with the stack valid bits described herein.

When an exception is possible, push and pop pairing may have to be prevented. If the exception occurs between the paired pushes or pops, there is no simple way of halting execution after the first push or pop but before the second push or pop since a 64-bit quantity containing both pushes or pops is written to either memory 26 or register file 10. The paired pushes or pops may simply both be canceled after issue once the exception is detected and the first push/pop re-issued without the second push/pop. Another approach when segmentation or debug exceptions cannot occur is to use the mis-aligned pair detection. When the new stack pointer points to the middle of a cache line and pairing pushes or pops will cross the cache line boundary, the pairing is prevented. Since page faults only occur when a memory reference crosses a page boundary, and pages are aligned to cache-line boundaries, preventing pairing also prevents page fault exceptions.

ALTERNATE EMBODIMENTS

Several other embodiments are contemplated by the inventors. For example only pushes but not pops may be paired if there is a limitation on the number of write ports to the register file. The reverse could also be implemented.

Other architectures may invert the x86 scheme and have their stack pointers point to the vacant location above the stack. In that case the stack pointer is decremented before a pop, but incremented after a push. The sense of increment and decrement can simply be reversed as well and thus the term increment refers to an adjustment which serves to increase the size of the stack rather than an absolute increase or decrease in an address. Address translation can further cloud the appearance of the direction of the stack address. The size of the increment or decrement has been described as 4-bytes, but other sizes may be used depending upon the size of the data pushed or popped from the stack. The data transferred may be program data such as operands or results, or address pointers, subroutine parameters, and register contents for subroutine calls and returns. The stack pointer may physically reside within the register file array, or it may be a separate register on the processor. Virtual or physical addresses before or after address translation may also be used.

While stack valid bits have been described for all stages, they may not be necessary and could be deleted for the final W stage if the stack pointer is written to register file 10 before the stack pointer is read in the D stage. Pipelining registers are needed between pipestages. For example, the inputs to adders 40 and 42 are latched from the previous stage. These pipeline registers hold all operands or inputs that are eventually added, whether the operands are the segment base address, a component of an address, a data operand, or the stack pointer. These pipeline register are overwritten once the add is completed. These temporary registers are thus part of the normal pipeline and are not shadowing the stack pointer but merely holding the stack pointer as an operand or input to the adders. Thus they are not dedicated to holding a shadow of the stack pointer but are used for any type of operand. A shadow register at the last stage could be used with the invention when the generation of the new stack pointer is pipelined.

The increment values have been described as being multiples of four bytes (−4, 0, +4). However, when a 16-bit (2-byte) operand is pushed or popped, the increment is −2 or +2. Likewise when a byte-operand is pushed or popped, the increment is −1 or +1. Additional stack valid bits may be used to encode these additional possible values for the increments. Other instructions besides push and pop which adjust the stack pointer's value may also benefit from the invention. Indeed, push and pop are generic terms for a group of instructions. Instructions that explicitly update the stack pointer, such as a move to the stack pointer register, can occur if other pushes and pops are stalled until the explicit move instruction completes.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A pipeline for processing multiple stack instructions comprising:

a plurality of pipeline stages for processing instructions;

a register file for storing operands for input to the pipeline and results from the pipeline;

a stack pointer register for storing a stack pointer indicating a top of a stack;

an array of stack-instruction valid bits for indicating which pipeline stages in the plurality of pipeline stages contain a stack instruction;

stack-top address generating means, receiving stack-instruction valid bits from the array of stack-instruction valid bits, for generating a memory address of the top of the stack in memory;

memory access means, responsive to the memory address from the stack-top address generating means, for transferring data between the stack in memory and the register file; and stack pointer update means, receiving the stack pointer, for adding a final adjust to the stack pointer and writing a sum to the stack pointer register when a stack instruction completes processing by the pipeline, whereby the stack-instruction valid bits indicate which pipeline stages in the plurality of pipeline stages contain a stack instruction, and the stack-instruction valid bits are used to generate the memory address of the stack in memory.

2. The pipeline of claim 1 wherein the absolute value of the final adjust for a particular stack instruction is equal to the size of the data transferred by the memory access means for the particular stack instruction.

3. The pipeline of claim 2 wherein the sign of the final adjust indicates if the particular stack instruction is a push stack instruction or a pop stack instruction, the push stack instruction reading data from the register file and writing the data to the stack in memory, the pop stack instruction reading the data from the stack in memory and writing the data to the register file.

4. The pipeline of claim 3 wherein the array of stack-instruction valid bits comprises a plurality of single-stage stack valid bits, each of the plurality of single-stage stack valid bits including displacement indicator means for indicating the amount and direction of the adjust for stack instructions being processed in that stage, the pipeline including means for copying the single-stage stack valid bits in the stage to the single-stage stack valid bits for a next stage when the stack instruction advances to the next stage in the pipeline.

5. The pipeline of claim 4 wherein the displacement indicator means for a particular stage containing a first stack instruction indicates an amount and direction of the adjust which is equivalent to the final adjust for the first stack instruction when the first stack instruction in the particular stage is advanced to the end of the pipeline and completes processing.

6. The pipeline of claim 5 wherein the stack-top address generating means comprises:

overall displacement generating means, receiving the stack-instruction valid bits, for generating an overall displacement between a memory address pointed to by the stack pointer in the stack pointer register and the top of the stack in memory to be accessed by a stack instruction at the beginning of the pipeline, the overall displacement being a sum of adjusts for other stack instructions in the pipeline which have not yet completed processing by the pipeline; and address adder means, receiving the overall displacement and the stack pointer from the stack pointer register, for generating as a sum the memory address of the top of the stack in memory.

7. The pipeline of claim 6 wherein the address adder means further adds in a segment base address to the overall displacement and the stack pointer when generating the memory address of the top of the stack, the segment base address being a base address for a stack segment in memory containing the stack.

8. The pipeline of claim 7 wherein the overall displacement generating means comprises an adder for adding single-stage displacements to generate the overall displacement, a single-stage displacement for a particular stage being equal to the final adjust when the stack instruction in a particular stage reaches the end of the pipeline and completes processing.

9. The pipeline of claim 8 further comprising stack-instruction pairing means for allocating two stack instructions to a single pipeline stage, the stack-instruction pairing means including:

means for doubling the size of the data transferred by the memory access means between the register file and the stack in memory, and means for doubling the magnitude of the adjust indicated by the displacement indicator means in the single-stage stack valid bits for a stage having paired stack instructions, whereby two stack instructions are processed together in the single pipeline stage by doubling an adjust amount in the stack-instruction valid bits and doubling the size of data transfer.

10. The pipeline of claim 9 further comprising:

mis-align detection means for detecting when paired stack instructions are not both contained in a single cache line;

pairing disable means, responsive to the mis-align detection means, for disabling the stack-instruction pairing means to not allocating two stack instructions to the single pipeline stage when the two stack instructions are not both contained in a single cache line.

11. The pipeline of claim 10 wherein the mis-align detection means comprises:

means for reading least-significant bits in the stack pointer, means for signaling a mis-alignment when the least significant bits in the stack pointer are not all equal to zero.

12. The pipeline of claim 11 wherein the least-significant bits in the stack pointer comprise a same number of bits as a number of binary bits for the size of the cache line.

13. The pipeline of claim 6 wherein the final adjust is a decrement.

14. A computer-implemented method for processing multiple stack instructions in a pipeline, the method comprising the steps of:

decoding a stack instruction at the beginning of the pipeline;

reading a stack pointer from a stack-pointer register, the stack pointer not including any increments or decrements for stack instructions in the pipeline which have not completed processing;

determining an overall displacement, the overall displacement being the sum of increments and decrements for stack instructions in the pipeline which have not completed processing;

generating the address of the top of a stack by adding the overall displacement to the stack pointer and to a segment base address, the segment base address being a starting address for a segment containing a stack;

applying the address of the top of the stack to a memory and transferring data between the stack in the memory and a register file for the pipeline;

reading the stack-pointer register and adding the stack pointer to a single-instruction displacement to generate an updated stack pointer, the single-instruction displacement being an increment or decrement for the stack instruction when the stack instruction is about to complete processing by the pipeline; and writing the updated stack pointer to the stack-pointer register when the stack instruction completes processing by the pipeline, whereby the stack-pointer register contains the only stack pointer, wherein stack pointers for instructions in the pipeline are not stored.

15. The computer-implemented method of claim 14 further comprising the step of:

reading an array of stack valid bits for the pipeline, the stack valid bits indicating the locations of stack instructions in the pipeline which have not completed processing by the pipeline; and determining from the stack valid bits the amount of increment or decrement for each stack instruction in the pipeline, whereby the stack valid bits indicate the increment or decrement for stack instructions in the pipeline.

16. The computer-implemented method of claim 15 wherein the updated stack pointer is not generated in a first half of the pipeline before the memory access but is only generated once in a last half of the pipeline.

17. The computer-implemented method of claim 15 wherein the overall displacement is the sum including an increment for the stack instruction at the beginning of the pipeline when the stack instruction at the beginning of the pipeline is a push instruction.

18. The computer-implemented method of claim 17 wherein the overall displacement is the sum not including a decrement for the stack instruction at the beginning of the pipeline when the stack instruction at the beginning of the pipeline is a pop instruction.

19. The computer-implemented method of claim 15 wherein the memory is a cache of a larger memory.

* * * * *